(12) United States Patent
Bouron

(10) Patent No.: US 7,769,594 B2
(45) Date of Patent: Aug. 3, 2010

(54) EVALUATION OF REPUTATION OF AN ENTITY BY A PRIMARY EVALUATION CENTRE

(75) Inventor: Thierry Bouron, Conflans Ste Honorine (FR)

(73) Assignee: France Telecom, Paris (FR)

( * ) Notice: Subject to any disclaimer, the term of this patent is extended or adjusted under 35 U.S.C. 154(b) by 1271 days.

(21) Appl. No.: 10/935,465

(22) Filed: Sep. 7, 2004

(65) Prior Publication Data

US 2005/0065810 A1    Mar. 24, 2005

(30) Foreign Application Priority Data

Sep. 5, 2003    (FR)    .................................. 03 10510

(51) Int. Cl.
*G06Q 99/00* (2006.01)
(52) U.S. Cl. ....................................... 705/1.1; 705/321
(58) Field of Classification Search ..................... 705/1, 705/1.1, 321
See application file for complete search history.

(56) References Cited

U.S. PATENT DOCUMENTS

| 2002/0046041 | A1* | 4/2002 | Lang ............................. 705/1 |
| 2002/0103801 | A1* | 8/2002 | Lyons ........................... 707/9 |
| 2002/0133365 | A1* | 9/2002 | Grey et al. ..................... 705/1 |
| 2003/0182421 | A1* | 9/2003 | Faybishenko et al. ....... 709/224 |
| 2005/0149383 | A1* | 7/2005 | Zacharia et al. ............... 705/10 |

FOREIGN PATENT DOCUMENTS

| WO | WO 01/15002 A2 | 3/2001 |
| WO | WO 01/61601 A1 | 8/2001 |

* cited by examiner

*Primary Examiner*—Jonathan Ouellette
(74) *Attorney, Agent, or Firm*—Cohen Pontani Lieberman & Pavane LLP

(57) ABSTRACT

The invention relates to a system and a method for evaluating the reputation of a given entity by a primary evaluation centre, comprising the following steps:
reception at the primary evaluation centre of a request by an applicant transmitting a request for an evaluation of the reputation of the given entity,
processing by the primary evaluation centre of the applicant's request in order to formulate a personalized evaluation of the reputation of the given entity according to processing rules dependent on the characteristics of the applicant known to the primary evaluation centre, and
sending of an answer to its request by the primary evaluation centre, to the applicant.

18 Claims, 8 Drawing Sheets

| Table of data on the evaluated objects | Evaluation of the entities | Es | Et | Eu |
|---|---|---|---|---|
| | Value V | Vs | Vt | Vu |
| | Certainty U | Us | Ut | Uu |
| | | Record data | | |

FIG. 7

Formula editor
Logic and algebraic operators:
+ - * ÷ = > ≥ < ≤ ∑ ∀ ∃ ∈ ∉  if-then-else-and-or-true-false
Parameters:
Request processed: r
Number of entities having transmitted the request: j
Set of Entities evaluated by Ek: {Eval} entity to be evaluated: e
Ordered list of entities having transmitted the request (E1, E2,..., Ej)

Default processing rule
Personalize the default rule using operators and parameters and record the modifications:
If j<4 and Ek acquaintances affinity (E1)>0.6 and e ∉ {Eval}
then result = Ek evaluation (e)

FIG. 8

Formula editor
Logic and algebraic operators:
+ - * ÷ = > ≥ < ≤ $\sum \forall \exists \in \notin$ if-then-else-and-or-true-false
Parameters:
Set of acquaintances Ek: {Acc}
Request processed: r
Number of values send in answer to the processed request: h
List of acquaintances of Ek having sent
a value: (E1, E2,..., Ej)
Entity that is the subject of the evaluation: Ek
Set of entities evaluated by Ek: {eval}

Default integration rule
C1 = Ek.acquaintances.confidence(E1) ; U1 = r.answer (E1).certainty ; V1 = r.answer(E1).value ;
C2 = Ek.acquaintances.confidence(E2) ; U2 = r.answer (E2).certainty ; V2 = r.answer(E2).value ;
Ch = Ek.acquaintances.confidence(Eh) ; Uh = r.answer (Eh).certainty ; Vh = r.answer(Eh).value ;
if Ex $\notin$ { eval } then U = ($\sum_{i=1}^{h}$ Ci*Ui) / h
$\quad\quad\quad$ V = ($\sum_{i=1}^{h}$ Vi*Ci*Ui) / ($\sum_{i=1}^{h}$ Ci*Ui) ;
$\quad$ else Uk = Ek.evaluation.certainty(Ex) ;
$\quad\quad\quad$ Vk = Ek.evaluation.value(Ex) ;
$\quad\quad\quad$ U = (($\sum_{i=1}^{h}$ Ci*Ui) + Uk) / (h+1) ;
$\quad\quad\quad$ V = ($\sum_{i=1}^{h}$ Vi*Ci*Ui) + Uk*Vk)) / (($\sum_{i=1}^{h}$ Ci*Ui) + Uk) ;

FIG.10

| Table of data on the acquaintances | Acquaintances of Ek | Ei | Ej | El | Em | En |
|---|---|---|---|---|---|---|
| | Affinity | - | 0,7 | 0,5 | 0,4 | 0,8 |
| | Confidence | - | 0,7 | 0,8 | 0,5 | 0,5 |
| | Declare new acquaintances | Record data | | | | |

FIG.12

| Table of data on the evaluated objects | Evaluation of the entities | Es | Et | Eu |
|---|---|---|---|---|
| | Value | 7 | 5 | 4 |
| | Certainty | 0,7 | 0,8 | 0,5 |
| | Declare new entities | Record data | | |

FIG.13

EVALUATION OF REPUTATION OF AN ENTITY BY A PRIMARY EVALUATION CENTRE

BACKGROUND OF THE INVENTION

The invention relates to an evaluation of reputation of a given entity by another entity called a primary evaluation centre. It applies more particularly to entities using an information transmission network and between which it is necessary to organize and establish confidential relationships.

In fact, an information transmission network of the "World Wide Web" (WWW) type constitutes a tool for information search and for interconnecting a set of users. It is used for data transfers between different machines for searching for different types of information and makes it possible to establish relationships between several entities administered for example by manufacturers, suppliers or clients throughout the world.

When it is necessary to deal with remote suppliers or providers whose reputation is not international, an essential problem is that of determining the confidence that can be placed in them, for example with regard to their technical competence or their ability to meet delivery times.

With regard to the access to content, confidence problems relate, among other things, to the validity and interest of information. Items of information can be provided on line by a product supplier, or by a technical services provider, but the objectivity of that information is not guaranteed.

The same type of problem arises when several entities of a large international industrial group can be brought to a position of ordering services from the same industrial concern without being able to cross-check, because of the large number and the geographic dispersion of the entities of the group, their opinions on the supplier or provider in question.

One solution used for evaluating the reputation the entities using an information networks is provided by the international application WO 01/61601, where the evaluation of each user or entity is public.

An inherent problem with this technique is that of evaluating the pertinence of the evaluations and therefore of having an opinion on the evaluators themselves who are not entities recognized as authorities in the field of the transaction.

Another problem relates to the publication of negative opinions of suppliers or providers. This publication is sensitive if one is subsequently brought into a situation of being in relationship with them. The anonymity of the entities issuing the opinions is not a satisfactory solution to this problem insofar as it accentuates the previous problem related to the ability to form an opinion of the evaluators.

Moreover, the international application WO 01/15002 describes a method of evaluation of content using two databases making it possible, on the one hand, to store the opinion of users on services and, on the other hand, the level of confidence of the users with respect to other users.

However, the evaluation made by an entity in answer to a request for the reputation of another entity is identical no matter what the origin of the request may be.

In fact, the evaluation by a given entity of another entity (an author, a supplier or a contractor) is a piece of knowledge that has a certain value and it is not in the interest of the entities to systematically publish their opinions in order to avoid, for example, a very heavy demand for evaluation requests.

PURPOSE AND SUMMARY OF THE INVENTION

The purpose of the invention is to overcome the above disadvantages and to provide a system and a method allowing the evaluation of the reputation of a given entity in a simple, secure, partially anonymous and personalized manner.

These purposes are achieved by means of a computer method of evaluating the reputation of a given entity by a primary evaluation centre comprising the following steps:

reception, by a reception means of the primary evaluation centre of a request sent by an applicant-entity transmitting a request for an evaluation of the reputation of the given entity, processing by a processing means of the primary evaluation centre of the applicant-entity's request in order to formulate a personalized evaluation of the reputation of the given entity according to processing rules dependent on the characteristics of the applicant-entity known to the primary evaluation centre, and sending, by a sending means of the primary evaluation centre, of an answer to the applicant-entity's request.

Thus, the invention allows the evaluation of the reputation of a given entity in a personalized manner by adapting a "word of mouth" recommendation mechanism to entities that are able to be located in geographic areas that can have a world wide extent and communicating solely by means of electronic media.

The processing of the applicant's request by the processing means of the primary evaluation centre comprises the following steps:

personalized transmission by a transmission means of the request received from the applicant-entity to a set of secondary evaluation centres with which the said primary evaluation centre is in contact, according to transmission rules dependent on the characteristics of the applicant-entity known to the primary evaluation centre, and integration by an integration means of the evaluation of the reputation of the given entity answers, received at the primary evaluation centre from the secondary evaluation centres, in the formulation of the personalized evaluation of the reputation of the given entity according to rules of integration dependent on the characteristics of the secondary evaluation centres known to the primary evaluation centre.

According to one feature of the invention, the applicant-entity, the primary evaluation centre and the secondary evaluation centres are entities using the same information transmission network such that each entity receiving a request from another entity serves as a primary evaluation centre, the entity sending the request corresponding to an applicant-entity and the entities with which the primary evaluation centre is in contact being able to comprise the secondary evaluation centres and the applicant-entity.

Advantageously, the processing, transmission and integration rules are defined in each entity corresponding to a primary evaluation centre and are modifiable separately by each entity.

Data comprising values of affinity and degrees of confidence associated with the entities with which the primary evaluation centre is in contact are entered or modified in a first data table comprised in the said primary evaluation centre by means of an acquisition tool.

Data comprising an opinion value and a certainty value for each of the evaluated entities are entered or modified in a second data table comprised in the said primary evaluation centre by means of the acquisition tool.

Advantageously, the answer to the request sent to the applicant-entity by the primary evaluation centre comprises an opinion value and a degree of certainty defining the reputation of the entity.

The characteristics of the applicant-entity comprise an affinity value previously defined by the primary evaluation centre.

The processing rules can furthermore be dependent on a retransmission number of the request, the request sent by the applicant-entity being a retransmission of a request sent in an iterative manner by a series of prior applicant-entities.

The processing rules can furthermore be dependent on at least a portion of the affinity values, previously defined by the primary evaluation centre, characterizing the series of prior applicant-entities.

According to a first particular aspect of the invention, the processing rules allow the evaluation of the reputation of the entity when, on the one hand, the retransmission number of the request is less than or equal to a threshold number predefined by the primary evaluation centre and when the affinity value of the applicant-entity is greater than or equal to a threshold affinity value predefined by the primary evaluation centre.

The transmission rules can depend on a set of parameters comprising the retransmission number of the request by the series of prior applicants, the affinity value of the applicant-entity and the degrees of confidence that the cent primary evaluation centre previously has with regard to the secondary evaluation centres.

Advantageously, the evaluation of the reputation of the given entity answers sent by the secondary evaluation centres to the primary evaluation centre each comprise an opinion value and a certainty value that each of the secondary evaluation centres has with respect to the given entity.

The integration rules can depend on a set of parameters comprising the opinion and certainty values included in the said evaluation answers as well as the degrees of confidence that the primary evaluation centre has with respect to the secondary evaluation centres.

The invention also proposes a system for evaluating the reputation of a given entity by a primary evaluation centre, characterized in that the primary evaluation centre comprises:
  a reception means making it possible to receive a request from an applicant-entity transmitting a request for an evaluation of reputation of the given entity,
  a processing means making it possible to process the applicant-entity's request in order to formulate a personalized evaluation of the reputation of the given entity according to processing rules dependent on characteristics of the applicant-entity known to the primary evaluation centre, and
  a sending means making it possible to send to the applicant-entity an answer to its request.

The system comprises a plurality of entities connected by the same information transmission network such that each entity receiving a request from another entity corresponds to a primary evaluation centre, the entity sending the request corresponds to an applicant-entity and the entities with which the primary evaluation centre is in contact comprise the secondary evaluation centres and the applicant-entity.

The invention also proposes a primary evaluation centre for evaluating the reputation of a given entity characterized in that it comprises:
  a reception means making it possible to receive a request from an applicant-entity transmitting a request for an evaluation of reputation of the given entity,
  a processing means making it possible to process the applicant-entity's request in order to formulate a personalized evaluation of the reputation of the given entity according to processing rules dependent on characteristics of the applicant-entity known to the primary evaluation centre, and
  a sending means making it possible to send to the applicant-entity an answer to its request.

The processing means of the primary evaluation centre comprises:
  a transmission means making it possible to transmit the request received from the applicant-entity to secondary evaluation centres with which the said primary evaluation centre is in contact, according to personalized transmission rules dependent on the characteristics of the applicant-entity known to the primary evaluation centre, and
  an integration means making it possible to integrate the evaluation of the reputation of the given entity answers, received by the reception means of the primary evaluation centre from the secondary evaluation centres, in the formulation of the personalized evaluation of the reputation of the given entity according to rules of integration dependent on the characteristics of the secondary evaluation centres known to the primary evaluation centre.

BRIEF DESCRIPTION OF THE DRAWINGS

Other features and advantages of the invention will emerge on reading the following description, given by way of indication and not limiting, with reference to the appended drawings in which:

FIG. 5 is a diagrammatic view showing an acquisition screen associated with the entity of FIGS. 3 and 4;

FIGS. 6 and 7 are diagrammatic views showing data tables associated with the entity of FIG. 4;

FIGS. 8 to 10 are diagrammatic views showing acquisition screens comprising examples of rules for processing, transmission and reception respectively, associated with the entity of FIG. 4; and FIGS. 11 to 13 are diagrammatic views illustrating an example of evaluation of the reputation of a given entity, according to the invention.

DETAILED DESCRIPTION OF EMBODIMENTS

Figure 1:
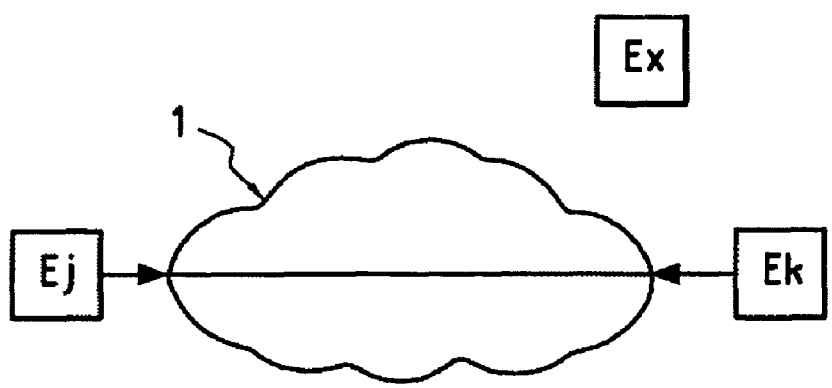
FIG. 1 is a very diagrammatic and general view of a system for evaluating the reputation of a given entity, comprising two other entities connected via an information transmission network according to the invention.

According to the invention, FIG. 1 shows in a very diagrammatic manner a system for evaluating the reputation of an entity $E_x$. The system comprises two entities $E_j$ and $E_k$ connected via an information transmission network 1 of the LAN local network, Internet network or telecommunication network type. Each entity can be a piece of software or an information service used on a server, a computer, a telephone or a personal digital assistant.

Thus, according to the invention, the entity $E_k$, called the "primary evaluation centre", receives a request transmitted by the other entity $E_j$, called the "applicant", requesting an evaluation of the reputation of the entity $E_x$.

The primary evaluation centre $E_k$ carries out a processing of the request according to processing rules dependent on the characteristics of the applicant $E_j$ which are known by the primary evaluation centre $E_k$, in order to formulate a personalized evaluation of the reputation of the entity $E_x$ and to send, to the applicant $E_j$, an answer to his application.

In fact, the primary evaluation centre $E_k$ can possess data comprising, for example, a value of affinity that it has with respect to the applicant $E_j$. Thus, the processing of the request can depend on this value according to rules defined by default or established by the primary evaluation centre $E_k$ by means, for example, of a formula editor.

Figure 2:
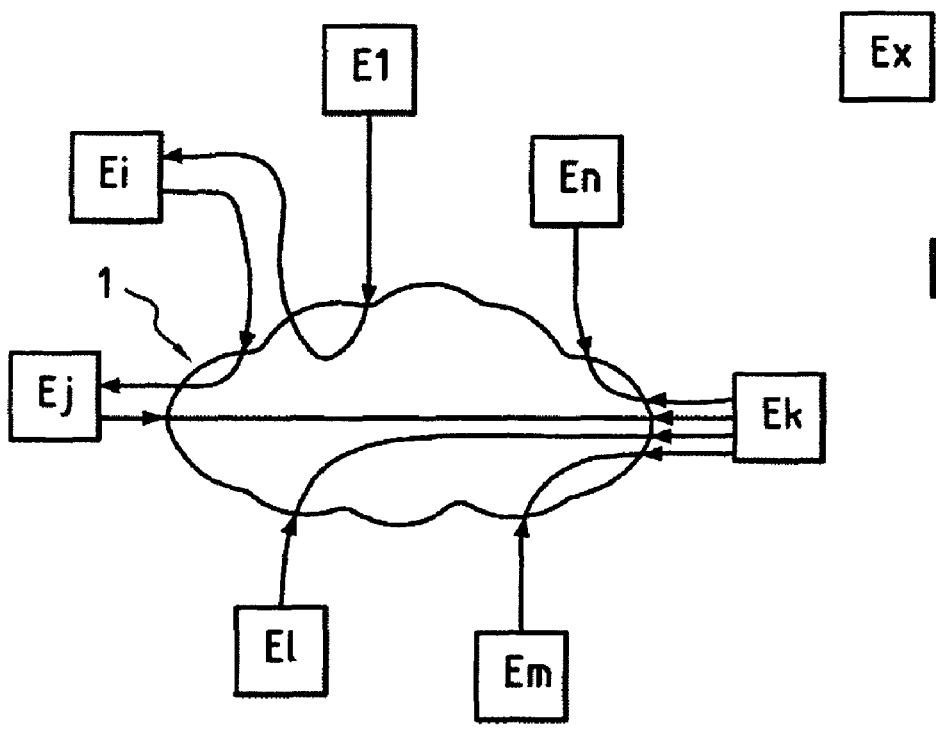
FIG. 2 is a very diagrammatic and general view of a system for evaluating the reputation of a given entity, comprising several other entities connected via an information transmission network according to the invention.

FIG. 2 shows, in a very diagrammatic way, a system for evaluating the reputation of a given entity, comprising several other entities connected via the information transmission network.

In fact, the primary evaluation centre $E_k$ can be in contact with a set of entities called secondary evaluation centres $E_l, \ldots, E_m, \ldots E_n$.

Thus, for the processing of the request to evaluate the reputation of the entity $E_x$, the primary evaluation centre $E_k$ can transmit, in a personalized manner, the request received from the applicant $E_j$ to this set of secondary evaluation centres $E_l, \ldots, E_m, \ldots, E_n$ with which it is in contact. The transmission can be carried out according to transmission rules dependent on the characteristics of the applicant $E_j$ which are known by the primary evaluation centre $E_k$.

In their turn, these secondary evaluation centres $E_l, \ldots, E_m, \ldots, E_n$ can send, to the primary evaluation centre $E_k$, answers regarding the evaluation of the reputation of the entity $E_x$.

The primary evaluation centre $E_k$ can therefore integrate these answers received from the secondary evaluation centres $E_l, \ldots, E_m, \ldots, E_n$ in the formulation of the personalized evaluation of the reputation of the entity $E_x$. The integration of these answers can be carried out according to integration rules dependent on the characteristics of the secondary evaluation centres $E_l, \ldots, E_m, \ldots, E_n$ known by the primary evaluation centre $E_k$.

It will be noted that the applicant $E_j$, the primary evaluation centre $E_k$ and the secondary evaluation centres $E_l, \ldots, E_m, \ldots, E_n$ are entities using the same information transmission network 1.

Moreover, the entity $E_x$ of which the evaluation of its reputation is requested can invariably be connected or not connected to the same information transmission network.

Each entity receiving a request from another entity can serve as a primary evaluation centre $E_k$, the entity sending the request corresponds to an applicant $E_j$ and the entities with which the primary evaluation centre $E_k$ is in contact can comprise, in addition to the applicant centre $E_j$, the secondary evaluation centres $E_l, \ldots, E_m, \ldots, E_n$.

Each entity can thus be a primary evaluation centre $E_k$, a secondary evaluation centre $E_l, \ldots, E_m, \ldots, E_n$ or an applicant $E_j$ according to the specific nature of the dialogue undertaken with the other entities.

Furthermore, the request sent by an applicant $E_j$ to a primary evaluation centre $E_k$ can be a retransmission of a request sent by another applicant $E_i$ or even a request sent in an iterative manner by a series of prior applicants.

It will be noted that the dialogue between the entities, that is to say the transmission, retransmission or reception of data between the entities is implemented by a data computer program or "middleware" distributed over several entities making it possible to cause the interoperation of other computer programs or software components resident in the different entities connected by the data transmission network.

An entity can thus, by means of this type of middleware, request the execution of a program, or of a function in applicative language, or of a method in object language, located on another entity and vice-versa.

The middleware can be of the "CORBA" or "RMI" type or software products of the "SOAP" type. The latter are used according to Internet standards and protocols (http, IP) and therefore make it possible to cause the interoperation of programs between entities connected to the Internet from their address.

The CORBA, RMI and SOAP middleware products thus easily allow the sending and receiving of requests and the sending of messages in answer to these requests. These messages can invoke methods of the "processing-recommendation" type corresponding to a processing of a recommendation request, that is to say the messages can initiate the execution of programs associated with these methods in a synchronous or asynchronous manner. In this case, the message received can be stored in a mailbox by the receiver and processed subsequently.

Thus, when an applicant $E_j$ wishes to know the reputation of an entity $E_x$, it sends request messages to each of these acquaintances, that is to say to each of the entities with which it is in contact.

In their turn, these entities can transmit the request to their respective acquaintances, and this can be done iteratively.

Each entity having received a request determines autonomously, according to a processing rule that can be personalized, which way it should process the received request and, if necessary, it determines, according to a rule for the transmission of requests that can be personalized, if in addition it should or should not forward this request.

Each entity having received a request considers its affinity for all or some of the succession of entities having transmitted the request to it in order to determine on the one hand if it should furthermore proceed with the evaluation on the basis of its own opinion on the matter or on the other hand if it should consult its acquaintances in which it has a certain degree of confidence in the matter. This degree of confidence can be fixed at a given threshold that can be set up for each entity or can be determined by an arithmetic calculation depending on the degree of affinity.

The answers sent in answer to a message corresponding to a request or a retransmission previously sent by an entity are received by that entity. These answers are opinions on the reputation, that is to say uncertain knowledge which can be defined by a pair of values describing a value of uncertainty or of certainty and an opinion value.

Thus, the answers of the evaluation of the reputation of the entity $E_x$ sent by the secondary evaluation centres $E_l, \ldots, E_m, \ldots, E_n$ to the primary evaluation centre $E_k$ each comprise an opinion value $V_l, \ldots, V_m, \ldots, V_n$ and a certainty value $U_l, \ldots, U_m, \ldots, U_n$ that each of the secondary evaluation centres $E_1, \ldots, E_m, \ldots, E_n$ has with respect to the entity $E_x$.

In fact, in a deductive reasoning model, a given proposition is assumed to be either true or false. The propositions which can be derived from these proposition by logic operators of the "and, or, negation" type are thus true or false. The knowledge for which the entity receiving the answers is not capable of affirming its truth value, for example knowledge representing opinions, is qualified by that entity as uncertain and a "subjective probability" representing a certainty value U is associated with each item of knowledge, or belief. All of the uncertain items of knowledge constituted by its answers are then integrated autonomously and in a way that can be personalized by that entity. The personalization of the integration rules for each of the entities can be carried out by means of the formula editor comprised in the entity.

An answer is formulated at the end of this integration procedure and is sent to the applicant $E_j$ that had made the corresponding request for an opinion. In particular, the answer sent to the applicant $E_j$ by the primary evaluation centre $E_k$ can comprise an opinion value V and a degree of certainty U defining the reputation of the entity $E_x$.

Figure 3:
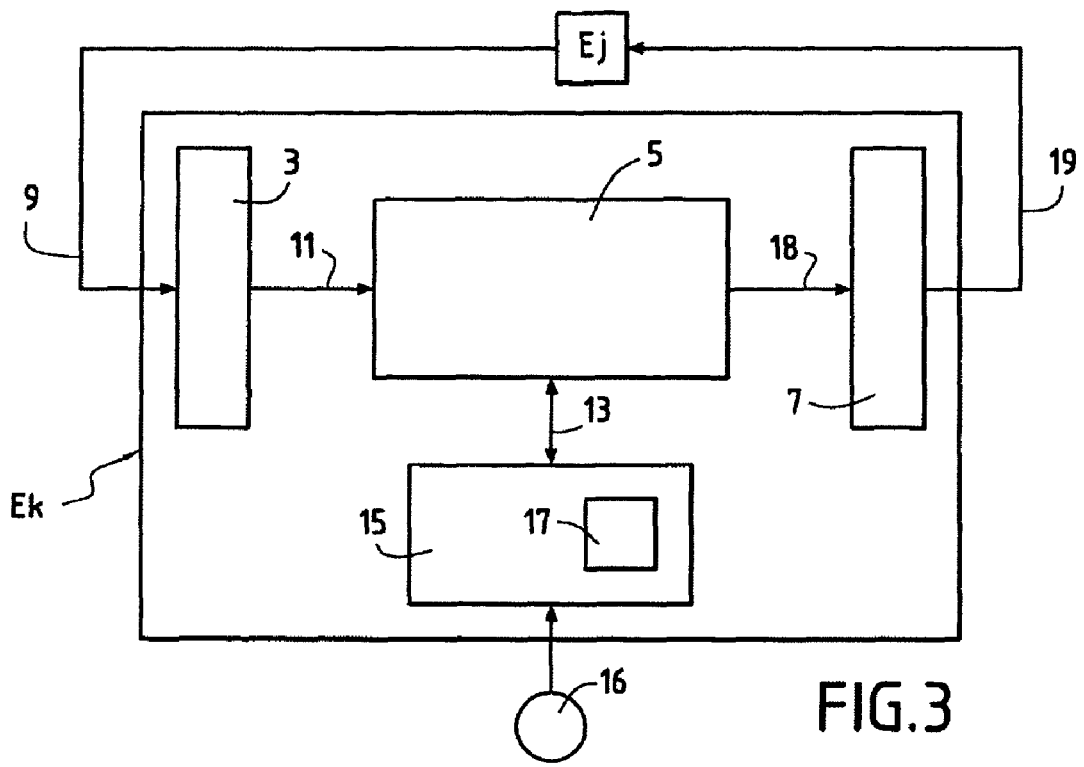
FIG. 3 is a very diagrammatic view showing an entity corresponding to a primary evaluation centre according to the invention.

FIG. 3 shows, very diagrammatically, an entity corresponding to a primary evaluation centre $E_k$.

This entity $E_k$ comprises a means of reception 3, a processing means 5 and a sending means 7. Thus, when the reception means 3 receives a request transmitted (link 9) by an applicant $E_j$ for the evaluation of the reputation of the entity $E_x$, it transmits (internal link 11) this request to the processing means 5.

The processing means 5 is in contact (internal link 13) with an acquisition tool 15 which allows the editing or modification of the processing rules by an administrator 16 of the entity $E_k$. Similarly, the processing means 5 is in contact with data tables 17 which comprise characteristics of the applicant $E_j$ known by the primary evaluation centre $E_k$. The characteristics of the applicant $E_j$ can comprise an affinity value $a_j$ of between 0 and 1, previously defined by the primary evaluation centre $E_k$.

Thus, the processing means 5 processes the request of the applicant $E_j$ by formulating a personalized evaluation of the reputation of the entity $E_x$ according to processing rules dependent on the characteristics of the applicant $E_j$.

The personalized evaluation of the reputation of the entity $E_x$ is then transmitted (internal link 18) to the sending means 7 which, in its turn, sends it (link 19) to the applicant $E_j$.

Figure 4:
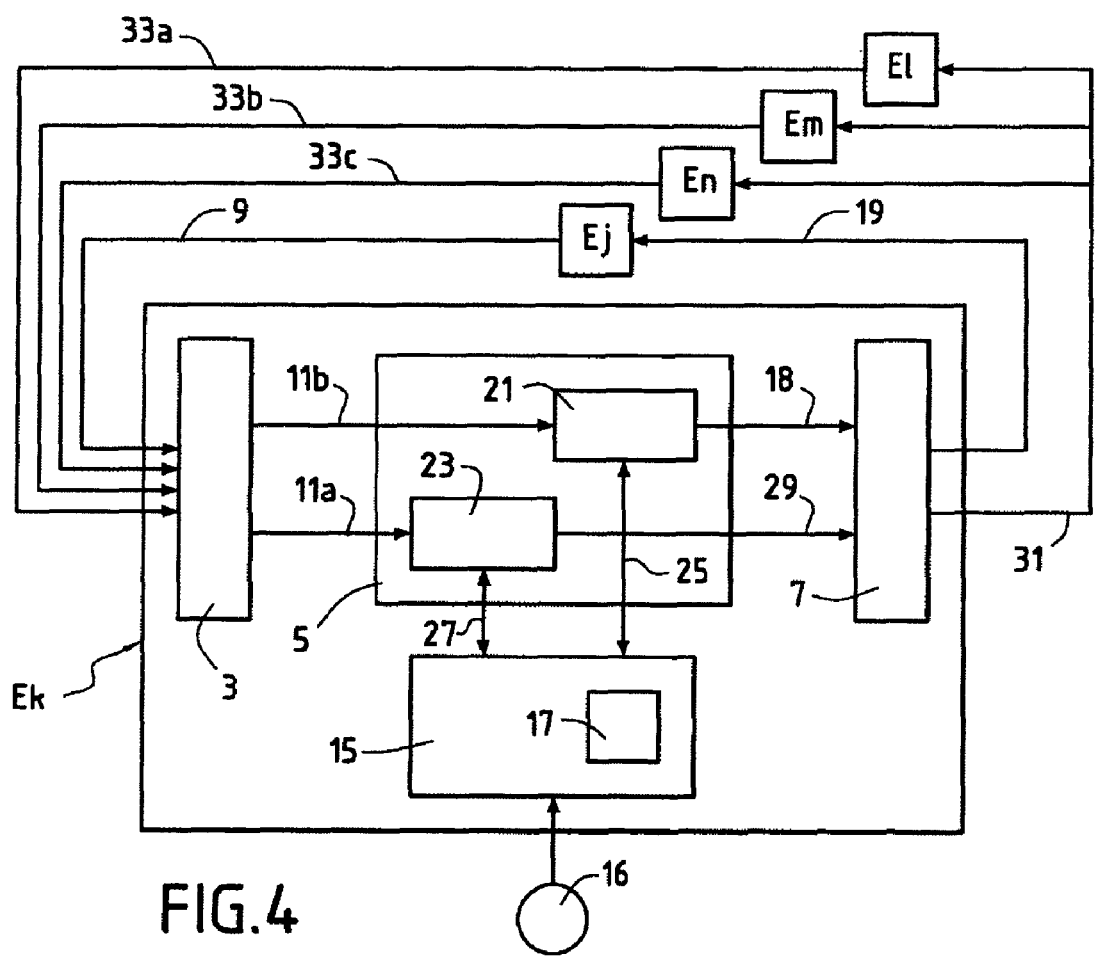
FIG. 4 is a variant of FIG. 3.

FIG. 4 shows, very diagrammatically, that the processing means 5 of the primary evaluation centre $E_k$ can comprise an integration means 21 and a transmission means 23, both being in contact (internal links 25, 27) with on the one hand the processing rules acquisition tool 15 and on the other hand with data tables 17.

In fact, the transmission means 23 makes it possible to transmit (internal link 29 and link 31), by the intermediary of the sending means 7, the request received (link 9 and internal link 11a) from the applicant $E_j$ to secondary evaluation centres $E_l, \ldots E_m, \ldots, E_n$ with which the said primary evaluation centre $E_k$ is in contact. The transmission is established according to transmission rules depending on the characteristics of the applicant $E_j$ contained in the data tables 17.

When the reception means 3 receives (links 33a, 33b, 33c) answers on the evaluation of the reputation of the entity $E_x$ sent by the secondary evaluation centres $E_l, \ldots, E_m, \ldots, E_n$, it transmits them (internal link 11b) to the integration means which integrates them in the formulation of the personalized evaluation of the reputation of the entity $E_x$ according to integration rules dependent on the characteristics of the secondary evaluation centres $E_l, \ldots, E_m, \ldots, E_n$ contained in the data tables 17. The personalized evaluation of the reputation of the entity $E_x$ is then transmitted to the sending means (internal link 18) which, in its turn, sends it (link 19) to the applicant $E_j$.

It will be noted that the various processing, transmission or integration rules can be predefined in each entity or can be edited or modified by the administrator 16 of the entity by means of the acquisition tool 15.

Figures 5, 6:
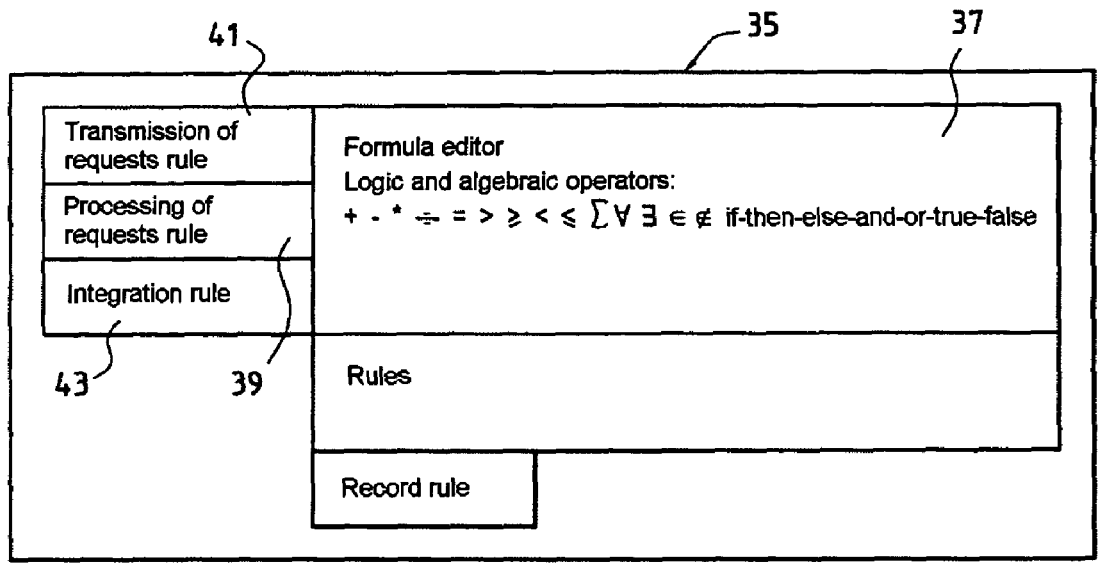

FIG. 5 shows an acquisition screen 35 comprising a formula editor 37 comprising logic and algebraic operators allowing the acquisition or modification and the recording of the various processing 39, transmission 41 or integration 43 rules.

These rules can be defined by default in each entity or modified separately by each entity.

The data tables 17 associated with each entity which serves as a primary evaluation centre $E_k$ can comprise two tables.

Affinity values $a_i, a_j, a_l, a_m, a_n$ and degrees of confidence $c_i, c_j, c_l, c_m, c_n$ associated with the entities $E_i, E_j, E_l, E_m, E_n$ with which the primary evaluation centre $E_k$ is in contact can be entered in a first data table 17a which can be displayed on the acquisition screen 35 (see FIG. 6).

In fact, the acquisition tool allows each administrator of an entity to acquire and record the entities with which his own entity is in contact and to indicate for each of them the affinity values $a_i, a_j, a_l, a_m, a_n$ and the degrees of confidence $c_i, c_j, c_l, c_m, c_n$. Each value or degree can be defined by a number between 0 and 1.

An affinity value is a parameter which can be used in order to have a processing of requests that differ according to their sender. This parameter is used in the various processing rules defined by default. For example, only requests for opinion coming from acquaintances for which the entity has an affinity higher than a given threshold can be processed. For the others an answer of the "no opinion" type can be formulated.

Moreover, this value can be used for determining if the entity forwards the request for information and to which acquaintances it forwards it. For example, a default transmission rule can be constructed such that, if it is a request coming from an applicant for which the entity has a strong affinity, it will transmit the request to entities in which it has high confidence and in the opposite case to entities in which it has lower confidence.

Moreover, data comprising an opinion value $V_s, V_t, V_u$ and a certainty value $U_s, U_t, U_u$ for each of the entities $E_s, E_t, E_u$ evaluated can be entered into a second data table 17b displayed on the acquisition screen 35 (see FIG. 7).

Thus, when an entity has formed its own opinion of another entity, for example during a previous interaction (dialogue, transaction), the administrator 16, by means of the acquisition tool 15, records the value of that opinion and associates a certainty value with it which will be higher if there has been numerous recent interactions between the entities. This data can be based on forms allowing the collection of appreciation following the dialogues between the entities.

In general, the editing of rules and the acquisition of data can be carried out manually by the administrator 16 of each entity.

It is also possible that the acquisition of data is carried out automatically or partially automatically by the processing means 5 of the primary evaluation centre $E_k$.

The set of entities in contact with the primary evaluation centre can be established automatically for example by means of an electronic address book of the primary evaluation centre and/or by means of probes, known per se, which allow the identification of the correspondents to whom the primary evaluation centre $E_k$ frequently sends messages or electronic data, for example at least once a week. It will be noted that telephone systems on the Internet, based for example on voice on IP techniques, allow the generalization of this type of acquisition to telephone contacts.

The affinity value regarding an entity can be established automatically according to the frequency of the messages sent by that entity to the primary evaluation centre $E_k$ or according to the frequency of the electronic messages exchanged between the administrators of these entities. It can also be coupled with the automatic detection of certain forms of words, for example forms of words of courtesy of the "sincerely" or "kind regards" type included in the messages.

Furthermore, the value of confidence in an entity can be established automatically by the primary evaluation centre $E_k$ by analyzing, for example using a heuristic method, the processing of the data that it receives from that entity. For example, a high confidence index can be assigned to an entity connected to the primary evaluation centre $E_k$ if the data sent by that entity or its administrator are largely retransmitted unchanged by the primary evaluation centre $E_k$ or by its administrator respectively to other entities and/or if that data is stored in a storage means of the primary evaluation centre $E_k$.

On the other hand, a low confidence index will be allocated to that entity in contact with the primary evaluation centre $E_k$ if the data sent by that entity is systematically destroyed by the primary evaluation centre $E_k$ before reading that data.

Furthermore, the establishment of the set of entities $E_s, \ldots, E_t, \ldots, E_u$ evaluated by the primary evaluation centre $E_k$ can be partially automated by using questionnaires, formulated automatically for the attention of that centre in order to note an evaluation value for each of these entities at the end of the interactions (dialogues or transactions) with them. These evaluations can be averaged with the previous evaluations concerning each entity. This average can be weighted according to all of the appreciations carried out by the primary evaluation centre $E_k$.

It will be noted that the certainty coefficient or value corresponding to an entity can be determined with respect to the variance of the evaluations and of the frequency of the messages between that entity and the primary evaluation centre $E_k$.

Furthermore, the processing rules can also depend on the affinity value of the applicant, on a retransmission number i of the request when the request sent by the applicant $E_j$ is a retransmission of a request sent iteratively by a series of prior applicants $E_1, \ldots E_i$ (see FIG. 2).

Similarly, the processing rules can depend on at least a portion of the affinity values, previously defined by the primary evaluation centre $E_k$ and which characterize the series of prior applicants $E_1, \ldots E_i$.

The processing rules can be formulated by default (see the example of FIG. 8) to allow the evaluation of the reputation of the entity $E_x$ when on the one hand the retransmission number i of the request is less than or equal to a threshold number I predefined by the primary evaluation centre $E_k$ and when the affinity value $a_j$ of the applicant $E_j$ is greater than or equal to a threshold affinity value A predefined by the primary evaluation centre $E_k$.

Furthermore, the transmission rules can be dependent of a set of parameters comprising the retransmission number i of the request by the series of prior applicants $E_l, \ldots E_i$, the affinity value $a_j$ of the applicant $E_j$ and the degrees of confidence $c_l, c_m, c_n$ that the said primary evaluation centre $E_k$ has previously with respect to the secondary evaluation centres $E_l, E_m, E_n$.

Figure 9:
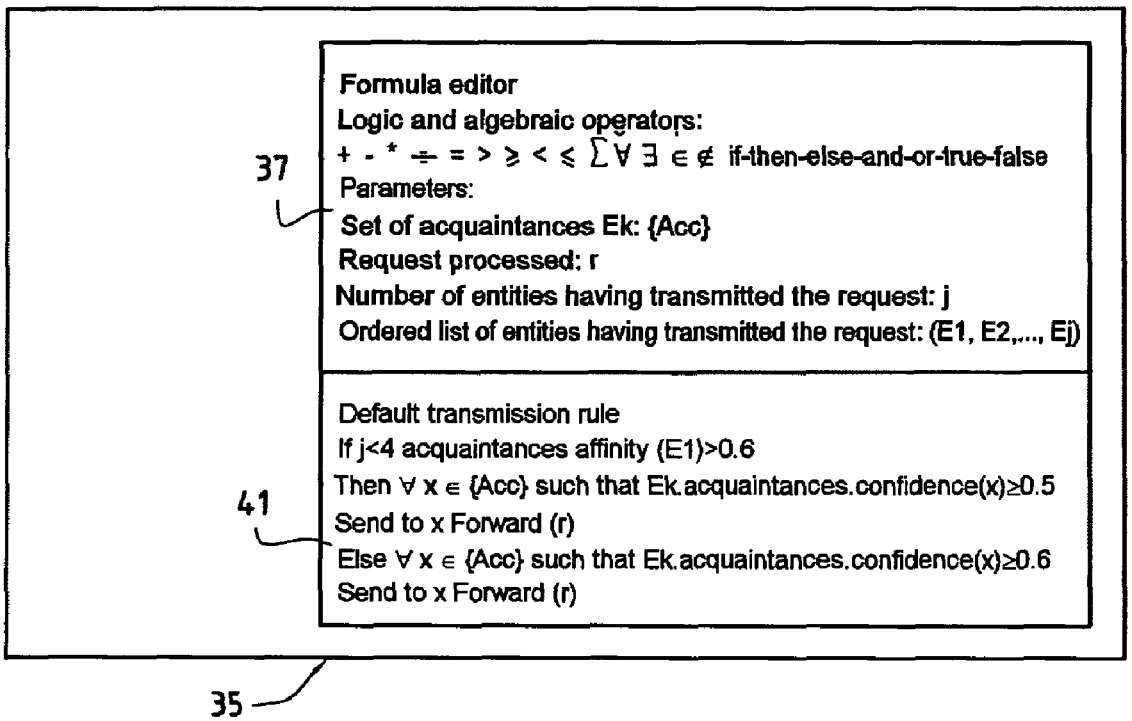

These transmission rules can be formulated by default (see the example in FIG. 9) in order to allow the transmission of the request received from the applicant $E_j$ to the secondary evaluation centres $E_l, E_m, E_n$ whose degrees of confidence $c_l, c_m, c_n$ are individually greater than or equal to a degree of confidence threshold C predefined by the primary evaluation centre $E_k$ if the affinity value $a_j$ of the applicant $E_j$ is greater than or equal to the threshold affinity value A and if the retransmission number i of the request is less than the threshold number I.

On the other hand, these transmission rules can allow the transmission of the request received from the applicant Ej to other secondary evaluation centres whose degrees of confidence are individually less than the degree of confidence threshold C previously defined by the primary evaluation centre $E_k$ if the affinity value $a_j$ of the applicant $E_j$ is less than the threshold affinity value A and if the retransmission number i of the request is greater than the threshold number I.

The integration rules can be dependent on a set of parameters comprising the opinion $V_l, V_m, V_n$ and on the certainty $U_l, U_m, U_n$ values comprised in the evaluation of the reputation of the entity $E_x$ answers sent by the secondary evaluation centres $E_l, E_m, E_n$ to the primary evaluation centre $E_k$, and the degrees of confidence $c_l, c_m, c_n$ that the primary evaluation centre $E_k$ has with respect to these secondary evaluation centres $E_l, E_m, E_n$.

Default integration rules (see the example of FIG. 10) can establish corrected certainties $U_l c_l, U_m c_m, U_n c_n$, by allocating each one with certainty values $U_l, U_m, U_n$ sent by the secondary evaluation centres $E_l, E_m, E_n$ with a multiplicative coefficient representing the corresponding degree of confidence $c_l, c_m, c_n$, thus making it possible to calculate on the one hand the certainty U defining the reputation of the entity $E_x$ by an average of the said corrected certainties $U_l c_l, U_m c_m, U_n c_n$ and, on the other hand, the opinion value V defining the reputation of the entity $E_x$ by the barycentre of the opinion values $V_l, V_m, V_n$ sent by the secondary evaluation centres $E_l, E_m, E_n$, weighted by the said corrected certainties $U_l c_l, U_m c_m, U_n c_n$.

The integration rules can of course comprise a real opinion value and a real certainty value defined by the primary evaluation centre $E_k$ knowing that in this case the confidence value is taken to be equal to unity.

Thus, default integration rules can be formulated by considering the following parameters:

Let {Acc} be a set which describes the acquaintances of the primary evaluation centre $E_k$;

Let r be a parameter which describes the considered request;

Let h be an integer which denotes the number of values sent in answer to the processed request. In fact, h makes it possible to know if all of the answers have been received;

Let $E_1, E_2, \ldots, E_h$ be a list which describes the acquaintances of the primary evaluation centre $E_k$ having sent an evaluation value;

Let $E_x$ be the entity which is the subject of the evaluation;

Let {eval} be a set which described the entities evaluated by $E_k$;

Let C1 denote the confidence that $E_k$ has for the acquaintance E1; U1 denote the certainty value returned by E1 in answer to r and V1 be the opinion value returned by E1 in answer to r.

Then, by using an object notation that is known per se, the default integration rule can be formulated as follows:

$C_1 = E_k$.acquaintances($E_1$).confidence; $U_1 = r$.answer($E_1$).uncertainty;

$V_1 = r$.answer($E_1$).value;

$C_2 = E_k$.acquaintances($E_2$).confidence; $U_2 = r$.answer($E_2$).uncertainty;

$V_2 = r$.answer($E_2$).value . . . ;

$C_h = E_k$.acquaintances($E_h$).confidence; $U_h = r$.answer($E_h$).uncertainty;

$V_h = r$.answer($E_h$).value;

If $E_x \notin \{eval\}$
then $U=(\Sigma^h_{i=1} C_i*U_i)/h$;
$V=(\Sigma^h_{i=1} V_i*C_i*U_i)/(\Sigma^h_{i=1} C_i*U_i)$;
else $U_k=E_k.evaluation.uncertainty (E_x)$;
$V_k=E_k.evaluation.value (E_x)$;
$U=((\Sigma^h_{i=1} C_i*U_i)+U_k/(h+1)$;
$V=((\Sigma^h_{i=1} Vi*Ci*U_i)+U_k*V_k))/((\Sigma^h_{i=1} C_i*U_i)+U_k)$.

Return (U,V)

Preferably, the processing log of a request by an entity is stored by that entity. Thus, a same request transmitted by different entities is not processed several times.

Figure 11:
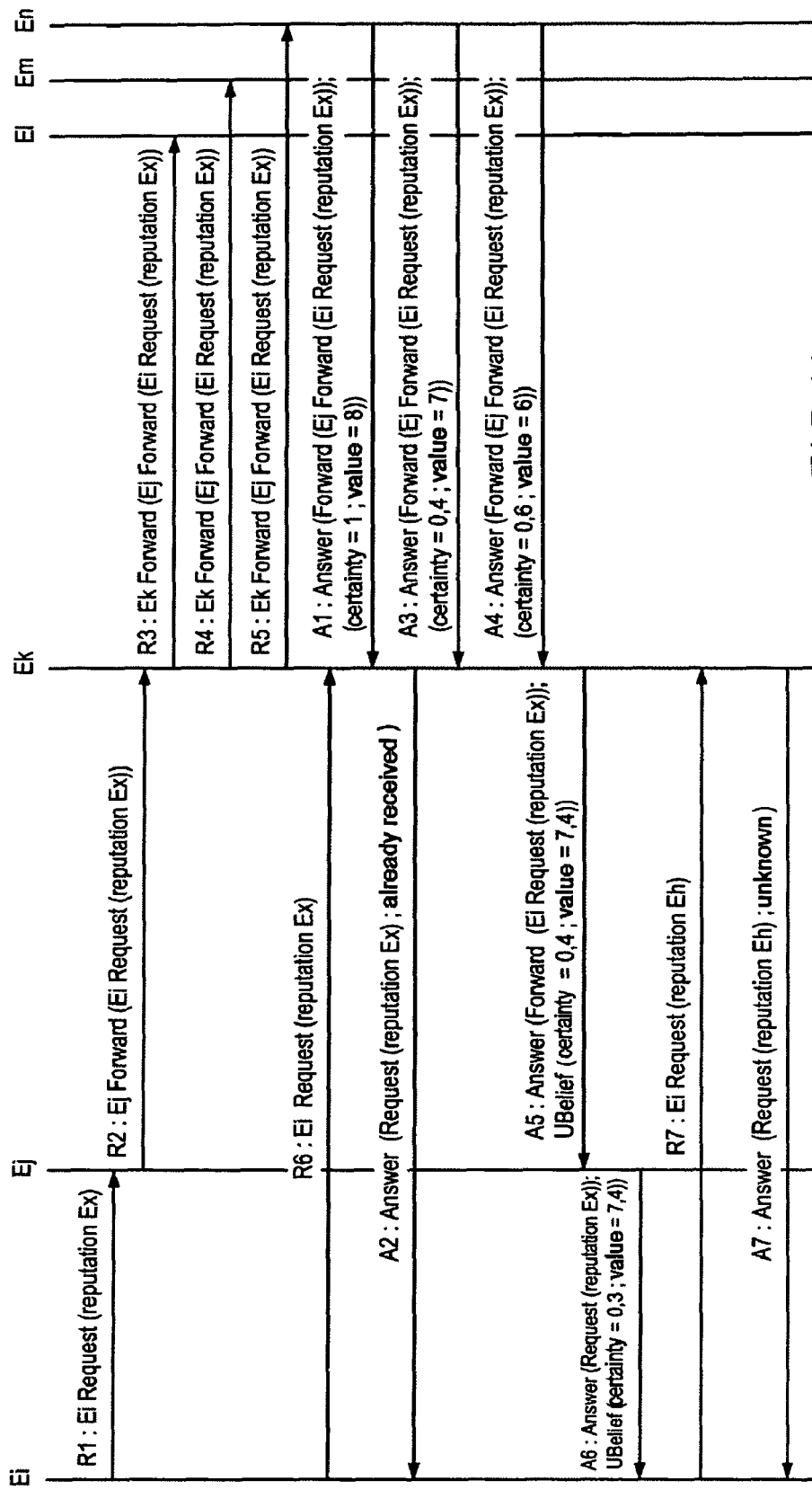

FIGS. 11 to 13 show an example of evaluation of the reputation of an entity by a primary evaluation centre according to the method and the system of the invention.

FIG. 11 shows a set of entities $E_i, \ldots, E_n$ using the same information transmission network.

Each entity has a list denoting all of the entities with which it is or has been in contact. This list can be entered manually or established automatically using the list of correspondents in an entity's electronic messaging system. Each entity is capable of sending and receiving electronic messages of the "request", "forward", "answer" type according to a protocol of the SOAP, RMI, CORBA or FIPA type. This send/receive mechanism can be based on an Internet network infrastructure.

According to FIG. 11, the entity $E_k$ denotes a primary evaluation centre, the entity $E_j$ denotes an applicant, the entity $E_i$ denotes a prior applicant and the entities $E_l, E_m, E_n$ denote the set of secondary evaluation centres associated with the primary evaluation centre.

The applicant $E_i$ sends request messages R1 and R6 to each of its acquaintances, that is to say to each of the entities $E_j$, and $E_k$, with which it is in contact requesting to know the reputation of an entity $E_x$. In their turn, these entities $E_j$, and $E_k$ can transmit the request to their respective acquaintances. Thus, the entity $E_j$ forwards the request by sending a message R2 to $E_k$, which in its turn sends the messages R3, R4, R5 to the entities $E_l, E_m$, and $E_n$ respectively.

FIG. 12 shows a first data table 17a relating to the primary evaluation centre $E_k$ comprising the affinity values $a_j=0.7$; $a_l=0.5$; $a_m=0.4$; $a_n=0.8$ and the degrees of confidence $c_j=0.7$; $c_l=0.8$; $c_m=0.5$; $c_n=0.5$ associated with the respective entities $E_j, \ldots E_n$ with which the primary evaluation centre $E_k$ is in contact. This table also shows that the primary evaluation centre $E_k$ does not possess affinity or confidence values with respect to the entity $E_i$.

FIG. 13 shows a second data table 17b relating to the primary evaluation centre $E_k$ comprising opinion values $V_s=7$; $V_t=5$; $V_u=4$ and certainty values $U_s=0.7$; $U_t=0.8$; $U_u=0.5$ for the entities $E_s, E_t$ and $E_u$ respectively.

According to this example, the primary evaluation centre $E_k$ receives a request from the applicant $E_j$ in the form "$E_j$ Forward ($E_i$ Request (reputation $E_x$))", which signifies that the applicant $E_j$ is transmitting to it a request sent by the prior applicant $E_i$ to know the reputation of the entity $E_x$.

The messages R3, R4, R5 sent by the primary evaluation centre $E_k$ to the entities $E_l, E_m, E_n$ are of the form "$E_k$ Forward ($E_j$ Forward ($E_i$ Request reputation $E_x$)))", which signifies that the primary evaluation centre $E_k$ is transmitting a request from the applicant $E_j$ which is transmitting to it a request sent by the prior applicant $E_i$ to know the reputation of the entity $E_x$.

In fact, according to this example (see FIGS. 9 and 12), the primary evaluation centre $E_k$ forwards the request to the secondary evaluation centres $E_l, E_m, E_n$, since their degrees of confidence $c_l=0.8$; $c_m=0.5$; $c_n=0.5$ are individually greater than or equal to the threshold degree of confidence C (in this example C=0.5) and the affinity value $a_j=0.7$ of the applicant $E_j$ is greater than the threshold affinity value A (in this example A=0.6) and the retransmission number i=2 of the request is less than the threshold number (in this example I=4).

The primary evaluation centre $E_k$ receives three answers A1, A3, A4 to its request concerning the reputation of $E_x$, a first answer from $E_l$ in which the centre $E_k$ has a confidence value equal to 0.8 "the entity $E_l$ estimates with certainty ($U_l=1$) that the reputation is equal to 8 ($V_l=8$) a second answer from $E_m$ in which $E_k$ has a confidence value equal to 0.5 (the entity $E_m$ estimates with a degree of certainty equal to 0.4 ($U_m=0.4$) that the reputation is equal to 7 ($V_m=7$) and a third answer from $E_n$ in which $E_k$ has a confidence value equal to 0.5 "the entity $E_n$ estimates with a degree of uncertainty equal to 0.6 ($U_n=0.6$) that the reputation is equal to 6 ($V_n=6$)".

According to this example, the primary evaluation centre $E_k$ has no prior opinion of $E_x$ (FIG. 13 contains no data regarding the entity $E_x$). It therefore send an answer A5 to the applicant $E_j$ by integrating in its answer solely the answers that it has received from the secondary centres $E_l, E_m, E_n$, by using, in this example, the default integration rules:

$U=(C1*U1+C2*U2+C3*U3)/N$ $V=(V1*C1*U1+V2*U2*C2+V3*U3*C3)/(C1*U1+C2*U2+C3*U3)$

Thus, the primary evaluation centre $E_k$ determines with a degree of certainty of 0.4 that the reputation of the entity $E_x$ is equal to 7.4.

In its turn, the applicant $E_j$ sends an answer A6 to the applicant $E_i$ taking account in its answer of its own integration rule. According to this example, the applicant $E_j$ determines with a degree of certainty 0.3 that the reputation of the entity $E_x$ is equal to 7.4.

Only the requests for opinion coming from acquaintances for which the primary evaluation centre $E_k$ has an affinity greater than a given threshold are processed. For the others, an answer of the "no opinion" type can be formulated.

In fact, according to this example, the applicant $E_i$ sends a message R7 to the entity $E_k$ requesting to know the reputation of an entity $E_h$.

However, according to this example, the entity $E_k$ does not have affinity or confidence values with respect to the entity $E_i$ (see FIG. 12) and therefore it sends an answer A7 to $E_i$ indicating that the reputation of the entity $E_h$ is not known.

Similarly, when an entity does not consider a request or has not obtained an answer to it, it transmits, in answer to the request, the message A7 indicating that the entity is not known.

It will be noted that because the processing and transmission log of a request by an entity is stored, the primary evaluation centre $E_k$ sends an answer A2 to the entity $E_i$ (in answer to the message R6), indicating that the request has already been received through the message R2.

The invention claimed is:

1. Computer method of evaluating the reputation of a given entity by a primary evaluation centre, characterized in that it comprises the following steps:
acquiring and storing characteristics of the applicant-entity by an acquisition tool of the primary evaluation center;
reception, by a reception means of the primary evaluation centre of a request sent by an applicant-entity transmitting a request for an evaluation of the reputation of the given entity independent of and after the acquiring and storing, processing by a processing means of the primary evaluation centre of the applicant-entity's request in order to formulate a personalized evaluation of the reputation of the given entity according to processing rules dependent on the characteristics of the applicant-entity previously defined by the primary evaluation centre, and sending, by a sending means of the primary evaluation centre, of an answer to the applicant-entity's request.

2. Method according to claim 1, characterized in that the processing of the applicant's request by the processing means of the primary evaluation centre comprises the following steps: personalized transmission by a transmission means of the request received from the applicant-entity to a set of secondary evaluation centres with which the said primary evaluation centre is in contact, according to transmission rules dependent on the characteristics of the applicant-entity known to the primary evaluation centre, and integration by an integration means of the evaluation of the reputation of the given entity answers, received at the primary evaluation centre from the secondary evaluation centres, in the formulation of the personalized evaluation of the reputation of the given entity according to rules of integration dependent on the characteristics of the secondary evaluation centres known to the primary evaluation centre.

3. Method according to claim 2, characterized in that the applicant-entity, the primary evaluation centre and the secondary evaluation centres are entities using the same information transmission network such that each entity receiving a request from another entity serves as a primary evaluation centre, the entity sending the request corresponding to an applicant-entity and the entities with which the primary evaluation centre is in contact being able to comprise the secondary evaluation centres and the applicant-entity.

4. Method according to claim 2, characterized in that the processing, transmission and integration rules are defined in each entity corresponding to a primary evaluation centre and are modifiable separately by each entity.

5. Method according to claim 4, characterized in that data comprising values of affinity and degrees of confidence associated with the entities with which the primary evaluation centre is in contact are entered or modified in a first data table comprised in the said primary evaluation centre by means of an acquisition tool.

6. Method according to claim 4, characterized in that data comprising an opinion value and a certainty value for each of the evaluated entities are entered or modified in a second data table comprised in the said primary evaluation centre by means of the acquisition tool.

7. Method according to claim 1, characterized in that the answer to the request sent to the applicant-entity by the primary evaluation centre comprises an opinion value and a degree of certainty defining the reputation of the entity.

8. Method according to claim 1, characterized in that the characteristics of the applicant-entity comprise an affinity value previously defined by the primary evaluation centre.

9. Method according to claim 1, characterized in that the processing rules are dependent on a retransmission number of the request, the request sent by the applicant-entity being a retransmission of a request sent in an iterative manner by a series of prior applicant-entities.

10. Method according to claim 1, characterized in that the processing rules are furthermore dependent on at least a portion of the affinity values, previously defined by the primary evaluation centre, characterizing the series of prior applicant-entities.

11. Method according to claim 10, characterized in that the processing rules allow the evaluation of the reputation of the entity when, on the one hand, the retransmission number of the request is less than or equal to a threshold number predefined by the primary evaluation centre and when the affinity value of the applicant-entity is greater than or equal to a threshold affinity value predefined by the primary evaluation centre.

12. Method according to claim 2, characterized in that the transmission rules depend on a set of parameters comprising the retransmission number of the request by the series of prior applicants, the affinity value of the applicant-entity and the degrees of confidence that the said primary evaluation centre previously has with regard to the secondary evaluation centres.

13. Method according to claim 2, characterized in that the evaluation of the reputation of the given entity answers sent by the secondary evaluation centres to the primary evaluation centre each comprise an opinion value and a certainty value that each of the secondary evaluation centres has with respect to the given entity.

14. Method according to claim 2, characterized in that the integration rules depend on a set of parameters comprising the opinion certainty values included in the said evaluation answers as well as the degrees of confidence that the primary evaluation centre has with respect to the secondary evaluation centres.

15. System for evaluating the reputation of a given entity by a primary evaluation centre, characterized in that the primary evaluation centre comprises:

acquiring and storing means configured to acquire and store characteristics of the applicant-entity;

a reception means configured to receive a request from an applicant-entity transmitting a request for an evaluation of reputation of the given entity independent of the acquiring and storing means, a processing means configured to process the applicant-entity's request in order to formulate a personalized evaluation of the reputation of the given entity according to processing rules dependent on characteristics of the applicant-entity previously defined by the primary evaluation centre, and a sending means configured to send to the applicant-entity an answer to its request.

16. System according to claim 15, characterized in that the system comprises a plurality of entities connected by the same information transmission network such that each entity receiving a request from another entity corresponds to a primary evaluation centre, the entity sending the request corresponds to an applicant-entity and the entities with which the primary evaluation centre is in contact comprise the secondary evaluation centres and the applicant-entity.

17. Primary evaluation centre for evaluating the reputation of a given entity characterized in that it comprises:

acquiring and storing means configured to acquire and store characteristics of the applicant-entity;

a reception means configured to receive a request from an applicant-entity transmitting a request for an evaluation of reputation of the given entity, independent of the acquiring and storing means, a processing means configured to process the applicant-entity's request in order to formulate a personalized evaluation of the reputation of the given entity according to processing rules dependent on characteristics of the applicant-entity previously defined by the primary evaluation centre, and a sending means configured to send to the applicant-entity an answer to its request.

18. Evaluation centre according to claim 17, characterized in that the processing means of the primary evaluation centre comprises: a transmission means making it possible to transmit the request received from the applicant-entity to secondary evaluation centres with which the said primary evaluation centre is in contact, according to personalized transmission rules dependent on the characteristics of the applicant-entity known to the primary evaluation centre, and an integration means making it possible to integrate the evaluation of the reputation of the given entity answers, received by the reception means of the primary evaluation centre from the secondary evaluation centres, in the formulation of the personalized evaluation of the reputation of the given entity according to rules of integration dependent on the characteristics of the secondary evaluation centres known to the primary evaluation centre.

* * * * *